(12) United States Patent
Giehl

(10) Patent No.: US 12,516,702 B2
(45) Date of Patent: Jan. 6, 2026

(54) ROLLING BEARING APPARATUS

(71) Applicant: Schaeffler Technologies AG & Co. KG, Herzogenaurach (DE)

(72) Inventor: Sebastian Giehl, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 98 days.

(21) Appl. No.: 18/568,276

(22) PCT Filed: Jun. 2, 2022

(86) PCT No.: PCT/DE2022/100414
§ 371 (c)(1),
(2) Date: Dec. 8, 2023

(87) PCT Pub. No.: WO2022/258107
PCT Pub. Date: Dec. 15, 2022

(65) Prior Publication Data
US 2024/0271665 A1      Aug. 15, 2024

(30) Foreign Application Priority Data

Jun. 10, 2021   (DE) .................. 10 2021 114 964.9

(51) Int. Cl.
*F16C 41/00*        (2006.01)
*F16C 19/26*        (2006.01)

(52) U.S. Cl.
CPC ............ *F16C 41/002* (2013.01); *F16C 19/26* (2013.01); *F16C 2212/08* (2013.01)

(58) Field of Classification Search
CPC ........................ F16C 41/002; F16C 2202/32
See application file for complete search history.

(56) References Cited

U.S. PATENT DOCUMENTS

| 9,790,995 B2 * | 10/2017 | White | H02K 11/40 |
| 11,070,114 B2 * | 7/2021 | Lenz | H02K 11/40 |
| 11,421,739 B2 * | 8/2022 | Hubert | F16C 33/586 |

(Continued)

FOREIGN PATENT DOCUMENTS

| DE | 102015206520 A1 | 10/2016 |
| DE | 102015224044 A1 | 10/2016 |
| DE | 102016010926 A1 | 9/2017 |

(Continued)

*Primary Examiner* — James Pilkington

(57) ABSTRACT

A rolling bearing apparatus includes an axis of rotation, a first machine element, a second machine element, a bearing ring attached to the first machine element and arranged concentrically on the axis of rotation, a set of cylinder rollers and a bypass apparatus. The set of cylinder rollers has a plurality of cylinder rollers and a cage. The set of cylinder rollers are arranged radially between the bearing ring and the second machine element, and directed radially transverse to the axis of rotation. The bypass apparatus forms an electrical connection between the first machine element and the second machine element. The bypass apparatus has an electrically conductive bypass conductor formed from loop-shaped stitched fibers and a holder attached on the bearing ring radially between the bearing ring and the first machine element. The holder is electrically conductively connected to the bypass conductor and holds the bypass conductor.

20 Claims, 10 Drawing Sheets

(56) References Cited

U.S. PATENT DOCUMENTS

2019/0063500 A1   2/2019   Hart

FOREIGN PATENT DOCUMENTS

| DE | 102017106695 B3 | 4/2018 |
| DE | 102018115732 A1 | 1/2020 |
| DE | 102018117315 A1 | 1/2020 |
| DE | 102014010269 B4 | 6/2020 |
| DE | 102019112825 A1 | 11/2020 |
| DE | 102020121735 A1 | 6/2021 |
| DE | 102021114965 A1 | 12/2022 |
| DE | 102021121290 A1 | 2/2023 |
| DE | 102021121292 A1 | 2/2023 |
| WO | 2020194191 A1 | 10/2020 |

* cited by examiner

ROLLING BEARING APPARATUS

CROSS-REFERENCE TO RELATED APPLICATIONS

This application is the United States National Phase of PCT Appln. No. PCT/DE2022/100414 filed Jun. 2, 2022, which claims priority to German Application No. DE102021114964.9 filed Jun. 10, 2021, the entire disclosures of which are incorporated by reference herein.

TECHNICAL FIELD

The present disclosure relates to a rolling bearing apparatus which is formed from at least one set of cylinder rollers, a bearing ring and a bypass apparatus.

BACKGROUND

Rotor shafts in electrical machines are usually mounted with rolling bearings. Unwanted voltage potentials often arise between the rotor shafts and housings of electric motors and generators. If no countermeasures are taken, these voltage potentials are discharged via the rolling bearings. The current flowing through the affected rolling bearing can generate sparks in the rolling contact between the rolling bodies and the raceways. The rolling raceways are damaged by melting indentations or erosion indentations.

Measures are already known which are intended to prevent the build-up of voltage potentials or the reduction of these voltage potentials via the rolling bearings. Bypass apparatuses are used, for example, with which discharges are conducted "around" the rolling bearings of the electric motor in a bypass manner via so-called shaft grounding rings. Such a bypass apparatus consisting of a shaft grounding ring is disclosed in DE 10 2016 010 926 A1. This shaft grounding ring has a disk-like, electrically conductive bypass conductor, which is clamped between two conductive angle plates towards the housing and which rests in an internally elastically preloaded manner on a shaft. The angle plates forming the holder of the bypass conductor are inserted into a housing at any suitable points. The bypass conductor consists of conductive material that has a lower resistance to flowing currents than steel, for example. The advantage of such bypass apparatuses is that the shaft grounding ring is simple and inexpensive to manufacture.

Experts also like to integrate bypass conductors into sealing apparatuses. An example of a buffer seal designed as a bypass conductor is disclosed in DE 10 2014 010 269 B4. The buffer seal is connected in a sealing manner in series upstream of a main seal and simultaneously, in the manner of a bypass conductor, establishes an electrically conductive connection between two machine elements. The disk-like bypass conductor is also intended to protect the sealing lip of the main seal against contamination from the surroundings and is attached to the main seal. The main seal sits in the housing with a holder formed from an angle plate.

In general, rolling bearing manufacturers are interested in using such bypass conductors in the direct and immediate vicinity of the rolling bearings which can be exposed to the damage described at the outset due to the reduction in voltage potential. In addition, the bypass conductors should be accommodated in an as space-saving manner as possible. This is why such bypass conductors are integrated into the main seals of rolling bearings, for example. Such an apparatus is disclosed in DE 10 2015 2240 44 A1. The main seal used in this apparatus is interfused with conductive filler.

SUMMARY

According to the disclosure, the bypass conductor, which is held by the holder attached to the bearing ring radially between the bearing ring and the machine element lying radially on the outside, consists of loop-shaped stitched fibers. The bearing ring sits in the radially outer machine element. The holder sits on the outer ring radially between the bearing ring and a housing. The holder comprises one or more retaining rings and one or more retaining disks. Current-dissipating bypasses are mostly used in deep groove ball bearings, since the point contact between the rolling body and the raceway, especially in regions of low contact surface pressure, can result in lightning discharges that damage the rolling bodies, raceways and lubricants. In the present case, the bypass is used with a set of cylinder rollers, although damage caused by the passage of current is somewhat rarely observed there due to the linear rolling body contact and thus the greater contact resistance. Furthermore, in the case of carbon fiber components, semi-finished products made of fabric are used, which are then laminated into a polymer matrix, mostly due to cheaper and simpler implementation during production. Positioned fibers, also known as "tailored fiber placement", are currently only used for aesthetic reasons in visible carbon components or for the targeted reinforcement of functional components, since this creates a very high level of complexity in production. Thus, inappropriate for the application envisaged here with respect to these aspects, a special, cost-intensive technology is used in this case to make targeted use of the conductive properties of the carbon fibers.

The term "stitched fibers" used below is to be understood as meaning both individual fibers and fiber pairs or fiber bundles. In the following, the term stitching describes any connection of the fibers, fiber pairs or bundles which uses an additional thread for connection. Sewing, crocheting or the like can also be seen as equivalent here.

The discharge device described here is made up both of a holder, which provides cutouts for air permeability, and of the bypass conductor, which is permeable to air and avoids pressure differences.

According to one embodiment, the loop-shaped stitched fibers of the bypass conductor are stitched in a meandering manner. Owing to the high positioning effort and associated high cycle times, punched-out round fabric blanks or radially circumferential, i.e., circular, patterns would generally be used for circular components. In order to make targeted use of the better conductivity in the fiber direction, a loop-shaped design of the bypass conductor is used for the application mentioned here. In the ideal case, this extends from the outer region of the holder to the contact region with the further machine element that can be moved mutually.

In a further embodiment, the loop-shaped stitched fibers of the bypass conductor are stitched with a double, superimposed meandering shape. This is particularly suitable for realizing an even higher number of individual fibers for the transmission of electrical currents and for reducing electrical resistance, while realizing a flat design at the same time.

In the rolling bearing apparatus, the bypass conductor can also be formed such that the stitched loop shape of the fibers depicts a polygon shape. This means that the loops encompass the center, i.e., the inner machine element.

Furthermore, the bypass conductor can be designed in such a manner that the loop-shaped stitched fibers of the bypass conductor have fiber cross sections open proximally towards the axis of rotation. Thus, the bypass conductor is constructed in such a way that the loops are realized only in the distal portions and the fiber cross sections, which point towards the axis of rotation, are open. Thus, the bypass conductor constitutes individual loops that are stitched together.

The bypass apparatus can contain a bypass conductor such that the loop-shaped stitched fibers are stitched with a further, concentrically arranged fiber bundle. Thus, an even further improved cohesion of the fibers can be ensured and contamination of the bearing or the installation space of the rolling bearing apparatus due to fiber loss can be avoided. In addition, stitching with another, concentrically arranged fiber bundle increases the rigidity of the bypass conductor, which ensures that the current-conducting fibers run centrally.

In an example embodiment, the loop-shaped stitched fibers of the bypass conductor of the rolling bearing apparatus comprise constituents of carbon or derivatives of carbon. These constituents are particularly suitable for conducting current in a bypass conductor of a rolling bearing apparatus, since they are characterized by high elasticity with high elongation at break and very good electrical conductivity.

In a further embodiment of the rolling bearing apparatus, the loop-shaped stitched fibers of the bypass conductor are stitched on a textile base fabric. This enables the ideal positioning during production. Furthermore, the bypass conductor can have special characteristics during use with respect to wear and electrical behavior. It is conceivable to disintegrate the textile base fabric again in a subsequent step, for example a washing process.

One or more bypass apparatuses are integrated into the rolling bearing apparatus. Here, the bypass conductor is connected to the bearing ring of the set of cylinder rollers, that it is attached radially in a space-saving manner not inside the rolling bearing but in the seat of the bearing ring—i.e., on the outside of the bearing ring between a housing and the bearing ring of the rolling bearing. No separate axial installation space is required for attaching the bypass conductor. The radial installation space is already provided due to the dimensions of the bearing ring of the set of cylinder rollers. This has a positive effect on the application in rolling bearing apparatuses with sets of cylinder rollers, in which there is little radial and axial installation space for accommodating bypasses. The limited space can be fully utilized to accommodate the bypass apparatus. The components for attaching the bypass conductor therefore do not have to be of such a delicate design and can therefore often also be produced more cost-effectively.

The rolling bearing apparatus has a set of cylinder rollers and a bearing ring. It is conceivable for there to be a further bearing ring or for the cylinder rollers to roll directly on the shaft or hollow shaft. The rolling bearing apparatus can also have a seal, which is arranged radially between the bearing ring and the shaft, or the bearing rings and a further machine element and is of any design, for example has one or more sealing lips in contact. This means that it can be in contact with a further bearing ring, i.e., the inner ring, the shaft or a shaft shoulder or an outer ring.

The bypass apparatus is arranged on one side of the rolling bodies in the axial direction such that an intermediate space is formed between the set of cylinder rollers and the bypass apparatus. At least one electrical connection is formed at least between the first and the second machine element via the bypass apparatus. It is therefore also conceivable for further electrically conductive connections between further machine elements to be designed as permanent or even such that they can be switched on and off via the bypass apparatus.

The bypass apparatus is composed of one or more holders and one or more electrically conductive bypass conductors. According to the disclosure, the holder sits in or on the bearing ring of the rolling bearing. The holder is a component of any design which is suitable for holding the bypass conductor in the rolling bearing. The properties of the bypass conductor can be individually matched to the contact or discharge resistance of the rolling bearing.

The holder and the bypass conductor are electrically conductively connected to one another. The holder is itself conductive, or the bypass conductor and the machine element are connected to each other via a separate electrical conductor—for example, via a conductive sleeve. In general, the bypass apparatus is designed in such a way that voltage potentials are discharged via said bypass apparatus and not via the set of cylinder rollers.

With the at least one set of cylinder rollers, two machine elements are mounted so that they can rotate relative to one another. In this case, one of the machine elements or the other machine element is rotatably mounted about the axis of rotation of the rolling bearing by means of the set of cylinder rollers, or the one or the other machine element is fixed to the housing. Alternatively, both machine elements are arranged to be rotatable relative to each other about the axis of rotation of the set of cylinder rollers. Machine elements are shafts, for example rotor shafts of an electrical machine, housings, for example end shields or housings or housing sections or end shields of an electrical machine, gearwheels or shafts or housings of a transmission or any other machine elements that are suitable for being mounted on or against one another by means of rolling bearings.

The axis of rotation of the set of cylinder rollers is always oriented axially in the cases considered, but can run horizontally or vertically as well as obliquely oriented in space. Radial is perpendicularly transverse to the axis of rotation.

The set of cylinder rollers is used for the rotatable mounting of machine parts, elements and assemblies and has cylindrical rolling bodies to reduce friction, which roll between the bearing ring and a further contact partner, for example a second bearing ring or a shaft, and thus reduce friction in the rotatable bearing arrangement.

The set of cylinder rollers can have a cage for guiding the rolling bodies and, as already explained above, is installed with a bearing ring and a further rolling partner, for example with a further bearing ring or a shaft to form a rolling bearing arrangement. Alternatively, the rolling bearing arrangement can also have more than just one inner and/or outer ring. In addition, the bearing ring or the bearing rings is/are alternatively also divided and has/have a raceway or a portion of a raceway. One or more outer raceways are usually formed on the radially inner contact partner, i.e., the shaft or the inner ring, and thus one or more inner raceways are formed on the outer ring. The rolling bodies rolling on the raceways are roller-shaped bodies. As already mentioned, the rollers are often guided and held in cages. The rolling bodies are either arranged one behind the other in a row in the circumferential direction or, alternatively, the arrangement has a plurality of rows of rolling bodies arranged next to one another.

In the context of the disclosure, the bypass is to be understood as the diversion of a current or a voltage around one or more rolling bearings and/or machine parts. The rolling bodies and the bearing ring are usually made of rolling bearing steel and touch each other on the raceway or raceways. The contact zones formed in this way are potential passages for currents where the feared discharges lead to damage to the raceways already described in the BACKGROUND section.

The currents are to be diverted via the bypass or via the bypass apparatus. On the one hand, this can be "controlled" in that the bypass apparatus or in any case the bypass conductor has comparatively lower electrical or specific electrical resistances relative to the rolling bearing.

It is conceivable for the set of cylinder rollers to be insulated against the passage of current. For example, it is conceivable for an insulator or an insulating layer to be applied between the bearing ring or bearing rings and the machine element on/in which the bearing ring is seated. In this case, the bypass guides the discharges past but not through the set of cylinder rollers only via the bypass elements of the bypass apparatus seated on the rolling bearing. In this case, the holder sits at or on the insulated bearing ring and has conductive contact with the machine element. For example, the holder sits on the outer ring and is resiliently preloaded in an elastic manner against the housing. Alternatively or in combination with other measures, it is also conceivable for the rolling bodies to be made of non-electrically conductive material such as ceramics. In this case, the bypass apparatus only has to divert the current.

As previously mentioned, the holder includes one or more retaining rings and one or more retaining disks. According to one embodiment, the holder or the retaining ring is provided with at least one cutout, e.g., a plurality of cutouts, which are distributed on the circumference around the axis of rotation of the rolling bearing arrangement and which extend axially continuously through a substantially radially extending and annular disk-like main body. The retaining disk engages with at least one retaining clip in the cutout and is held on the main body. The bypass conductor is held axially between the electrically conductive retaining ring and the retaining disk. The retaining clip or the retaining clips are form-fittingly and/or frictionally latched or hooked in the cutout. Such an arrangement is easy to assemble. The individual parts of the holder can be produced inexpensively from sheet metal.

The design of the bypass apparatus may be directed exclusively to the electrical conductivity and the installation situation, but not to a sealing function. When bypass conductors are integrated into sealing systems, compromises have to be made with respect to the choice of material properties for the seals and also for the bypass conductor. When designing the bypass conductor of a bypass apparatus, only the requirements for electrical conductivity and wear resistance need to be taken into account when selecting and designing the material. A freely permeable passage for media from the environment in front of the bypass holder into the intermediate space is guaranteed in the bypass holder or the bypass apparatus.

One way of implementing the rolling bearing apparatus is to design the holding element or the retaining ring in such a way that it has a plurality of clamps distributed over the circumference of one of the bearing rings or the retaining elements are such clamps. These clamps are arranged radially between the bearing ring and the machine element, for example between the outer ring and a housing or between the inner ring and a shaft, and thereby overlap the bearing ring axially and engage behind the bearing ring radially. The clamps are designed to be elastically resilient and radially preloaded between one of the machine elements and the bearing ring against one of the bearing rings.

Here, the zones on the bearing ring to which the retaining ring is attached or against which the retaining elements are preloaded against the bearing ring do not have to be finely machined because the retaining elements are preloaded at least radially elastically against this zone. The elasticity of the individual retaining elements is ensured by the fact that they are separated from one another circumferentially around the axis of rotation of the set of cylinder rollers by the axially continuous cutouts. As a result, the retaining elements are lengthened by a radially extending elastic lever, starting from a base on the retaining ring. In conjunction with a snap geometry, the retaining element can bridge large tolerances when pressed on and is securely fixed axially and radially. The retaining rings are easy and inexpensive to produce from sheet metal or spring steel.

According to a further possibility of implementing the rolling bearing apparatus, one or more clamping elements or retaining clips formed on the retaining disk or separately, each or more than one, engage in one of the cutouts and hold the retaining disk and the retaining ring to each other in a form-fitting manner. The bypass conductor is clamped axially between the clamping element and the holder or between the retaining disk and the retaining ring. The clamping element can, for example, be a simple clamp that is inserted into the cutout, or the clamping element or the retaining clip are formed on the retaining ring of the holder. Clamping elements are releasably or non-releasably clamped to the retaining ring, and retaining clips are, for example, clipped or snapped into the cutouts in a form-fitting manner and, under certain circumstances, can also be released again.

It is also conceivable for the holder to rest on the bearing ring in an electrically conductive manner when it is in contact with the bearing ring. The holder is made of electrically conductive material or has a conductive coating or is provided with conductive elements. It is crucial that an electrically conductive connection is formed between the machine element and the holder either via the electrically conductive bearing ring or in direct contact with the holder. The bearing ring is made of a conductive material or has an electrically conductive coating. In general, it can be assumed in this case that the electrical resistance of the bypass apparatus is lower than the electrical resistance in the passage through the rolling contacts of the rolling bearing arrangement.

The rolling contacts are the contacts against which the rolling bodies bear on the raceway or raceways during operation or when the rolling bearing is at a standstill. The zones of the rolling contact are thus the zones in which the rolling bodies roll during operation of the rolling bearing on the rolling raceway or raceways of the bearing ring or bearing rings or the shaft. The electrically conductive connection for discharging the voltage potentials between the first and second machine element is established by means of the bypass apparatus. As already mentioned at the outset, the machine elements can be housing or shafts or alternatively also other machine parts. Therefore, it is conceivable for the second machine element to also be an inner ring of the rolling bearing. It is therefore not excluded that at least one bearing ring of the rolling bearing is a conductive constituent of the bypass apparatus.

It is also conceivable for the second machine element to be a hollow-cylindrical component. In this case, the hollow-cylindrical component is a constituent of the bypass apparatus, in particular when the set of cylinder rollers with a bearing ring is prepared with a bypass apparatus as a structural unit for installation. Transmission manufacturers often fight for every millimeter of installation space. The height of the flanges, which rise radially above the rolling raceway at the side of the rolling raceways, influences the radial dimension of the annular gap between the inner ring and the outer ring. As a result of these measures, the remaining annular gap for the installation of a bypass apparatus can be too small. In addition, a radial contact surface is required for the contact of the bypass conductor with either a machine element or the bearing ring, on which the bypass conductor makes the conductive transitional contact between the machine element or the bearing ring. For this purpose, either a shaft, a hollow shaft or an extended bearing ring can be prepared as a contact surface. In this case, current-conducting coatings on the counter surface of the bypass conductor are particularly suitable. Furthermore, this contact surface can be prepared on a machine element in the form of a hollow-cylindrical component, which is either attached to the bearing ring or is seated on the machine element. The hollow-cylindrical component can be designed in the simplest way as a sleeve cut from a tube or wound or drawn from sheet metal. Such a sleeve can be produced inexpensively and can also be provided with a conductive coating, for example. It can advantageously be exchanged for a wide variety of designs thereof, without the set of cylinder rollers having to be changed per se.

The sleeve saves radial installation space so that more radial space is available for the bypass apparatus. In addition, the sleeve can be designed as a conductive component with respect to its shape and the choice of materials in a manner that would not be possible with a bearing ring, for example, because, generally speaking, primarily the requirements of load capacity and service life of a rolling bearing must be taken into account in the design and material selection of a bearing ring. In addition, special friction or sliding properties in the contact zone with the bypass conductor can be taken into account when coating or choosing the material of the sleeve.

The set of cylinder rollers and all of the components mentioned above are designed as a self-retaining structural unit, possibly also in combination with one or both machine elements. On the one hand, such a structural unit keeps the storage and transport capacities positively small and, on the other hand, the effort involved in installing the rolling bearing apparatus in a vehicle transmission, an electric machine, an electrically operated axle or in any other system is lower compared to the individual installation of components.

The set of cylinder rollers of the rolling bearing apparatus concerned with the disclosure can be guided with or without a cage or cages. A cage has one or two side edges.

As already mentioned, transmission manufacturers often fight for every millimeter of installation space. This also has an effect on the requirements for the set of cylinder rollers, which should consequently be designed in a space-saving manner in the axial direction. The aforementioned measure also contributes to saving axial installation space. Here, the retaining elements of the retaining ring engage over the bearing ring in the axial direction and engage radially behind it. For this purpose, as provided with one embodiment of the disclosure, a radial annular gap is formed between the bearing ring and the machine element. On one side, from the end of the bearing ring, the retaining elements engage axially in the annular gap formed, for example, between the outer ring and the housing. Existing installation space is used without the bearing ring having to be lengthened axially for the purpose of a holding zone for attaching the bypass apparatus.

It is conceivable to design the rolling bearing apparatus in such a way that, when sets of cylinder rollers with at least one cage are used, at least one end of the lateral edge delimiting the lateral edge axially in the direction of the bypass conductor, or, the entire lateral edge of the cage, extends radially between the axis of rotation and the retaining element of the bypass apparatus around the axis of rotation. The attachment for the bypass apparatus does not require any additional installation space axially.

BRIEF DESCRIPTION OF THE DRAWINGS

In the following, the disclosure is explained in more detail with reference to exemplary embodiments. In the drawings.

DETAILED DESCRIPTION

Figure 1:
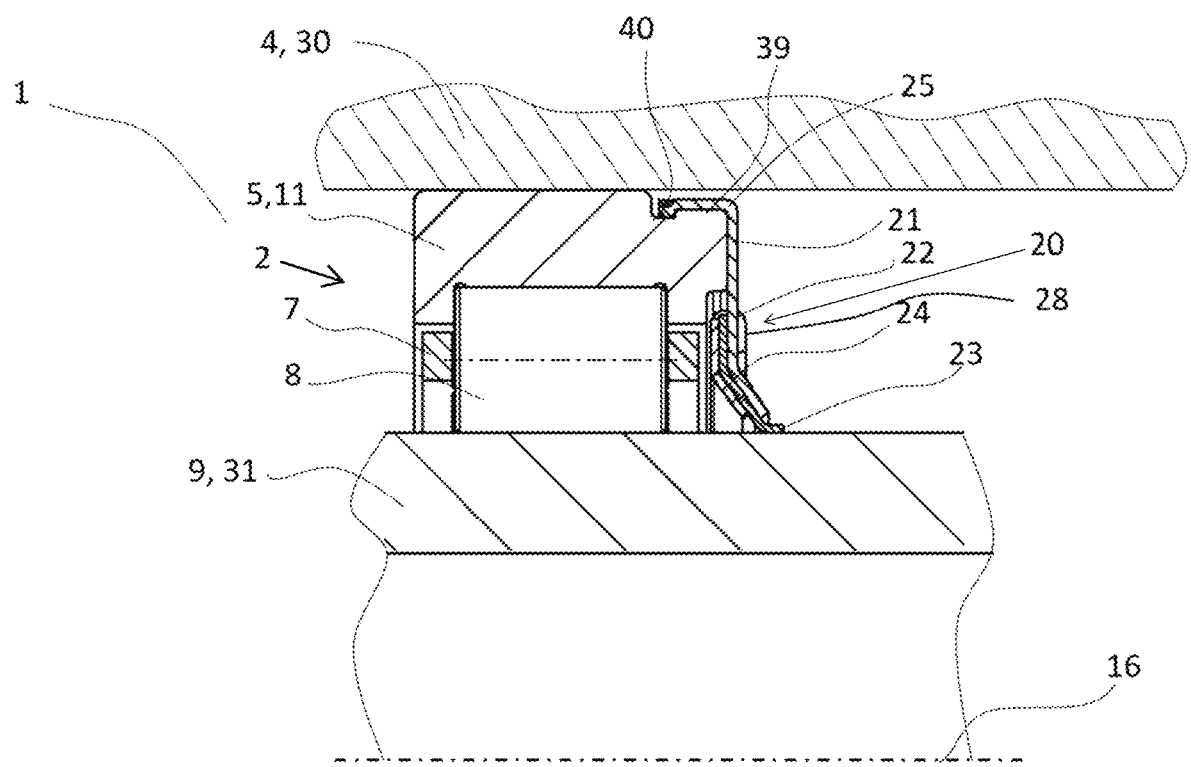
FIG. 1 shows an exemplary embodiment of a rolling bearing apparatus 1 according to the disclosure in partial section along the axis of rotation 16.

FIG. 1—The rolling bearing apparatus 1 is formed from the set of cylinder rollers, a bearing ring 5, 11 and a bypass apparatus 20 and has a first machine element 30 and a second machine element 31. The first machine element 30 can be designed, for example, as a housing 4, the second machine element 31 can be designed, for example, as a shaft, as a hollow shaft 9 or as an inner bearing ring. The set of cylinder rollers comprises a plurality of cylinder rollers 8 and can have a cage 7. The bearing ring 5 is arranged concentrically on an axially oriented axis of rotation 16 of the set of cylinder rollers 2. The set of cylinder rollers 2 is provided with cylinder rollers 8 arranged radially between the bearing ring 5 and the second machine element 31, wherein these are directed radially transverse with respect to the axis of rotation 16. An electrical connection between the first machine element 30 and the second machine element 31 is formed via the bypass apparatus 20.

The bypass apparatus 20 has a holder 21 and at least one electrically conductive bypass conductor 23, wherein the holder 21 and the bypass conductor 23 are electrically conductively connected to one another. The holder 21 is attached to the bearing ring 5, 11 radially between the bearing ring 5 and one of the machine elements 4, 30. The holder holds the bypass conductor 23, wherein the bearing ring 5 is attached to the machine element 31. The bypass conductor 23 is formed from loop-shaped stitched fibers.

Figure 2:
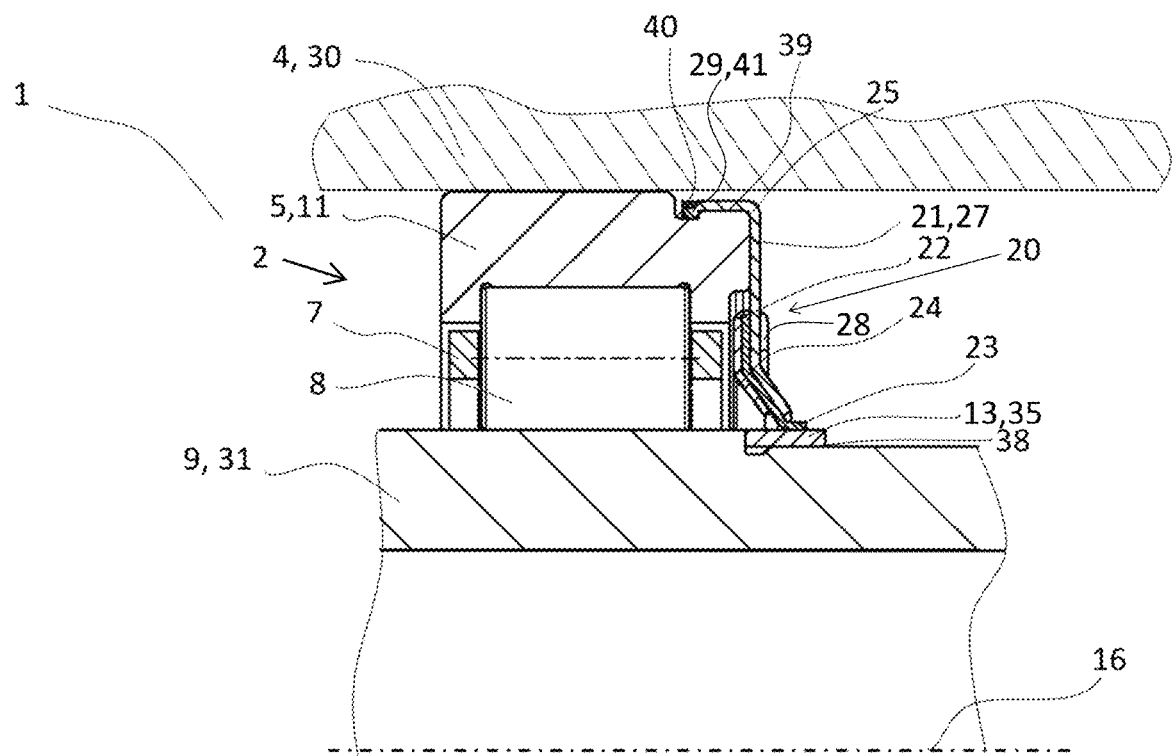
FIG. 2 shows a further exemplary embodiment of a rolling bearing apparatus 1 according to the disclosure in partial section along the axis of rotation 16.

FIG. 2—In an example embodiment, the rolling bearing apparatus 1 can have a second machine element designed as a sleeve 13. The sleeve 13 is provided on the inside and on the side of the bypass apparatus 20 at a diameter step with an inner-cylindrical inner seat surface 38 on which the sleeve 13, designed as a hollow-cylindrical component, sits, for example held by a press fit.

The bypass apparatus 20 has a holder 21, a retaining disk 24, an electrically conductive bypass conductor 23 and the sleeve 13. Retaining elements 25 are formed on a radially extending main body 27 of a retaining ring 22 of the holder 21, of which retaining elements only one retaining element 25 is visible in the representation according to FIGS. 1 and 2. The outer ring 11 is provided with a diameter step on the outside, on which an outer seat surface 39 is formed. The cylindrically designed outer seat surface 39 has a diameter which is smaller than the outer diameter of the outer ring 11 for the housing seat. The outer seat surface 39 is axially adjoined by a radial depression 40 which could consist of depressions 40 adjacent to one another circumferentially, but in this case is designed as an annular groove 40. Clamps 29 of the retaining elements 25 are radially resilient and are pushed onto the overhang during assembly, moving elastically outwards, extending axially over the outer seat surface 39 to the annular groove 40 and finally snapping into the annular groove 40 with the radial protrusions 41, then being radially latched with the protrusions 41 latching in the annular groove 40 and, for example, bearing radially against the outer seat surface 39 or being preloaded radially against this.

The bypass conductor 23 is clamped axially between the retaining disk 24 and a main body 27 of the retaining ring 22. The retaining disk 24 is fixed to the main body 27 with retaining clips 28. Of the retaining clips 28, only one retaining clip 28 is visible in the image due to the sectional view. In the rolling bearing apparatus 2 there is an electrical connection between the outer ring 11 via the clamps 29 and the annular disk 22 to the bypass conductor 23 and from the bypass conductor 23 to the sleeve 35 and from the sleeve 35 to the second machine element 9, 31.

Figure 3:
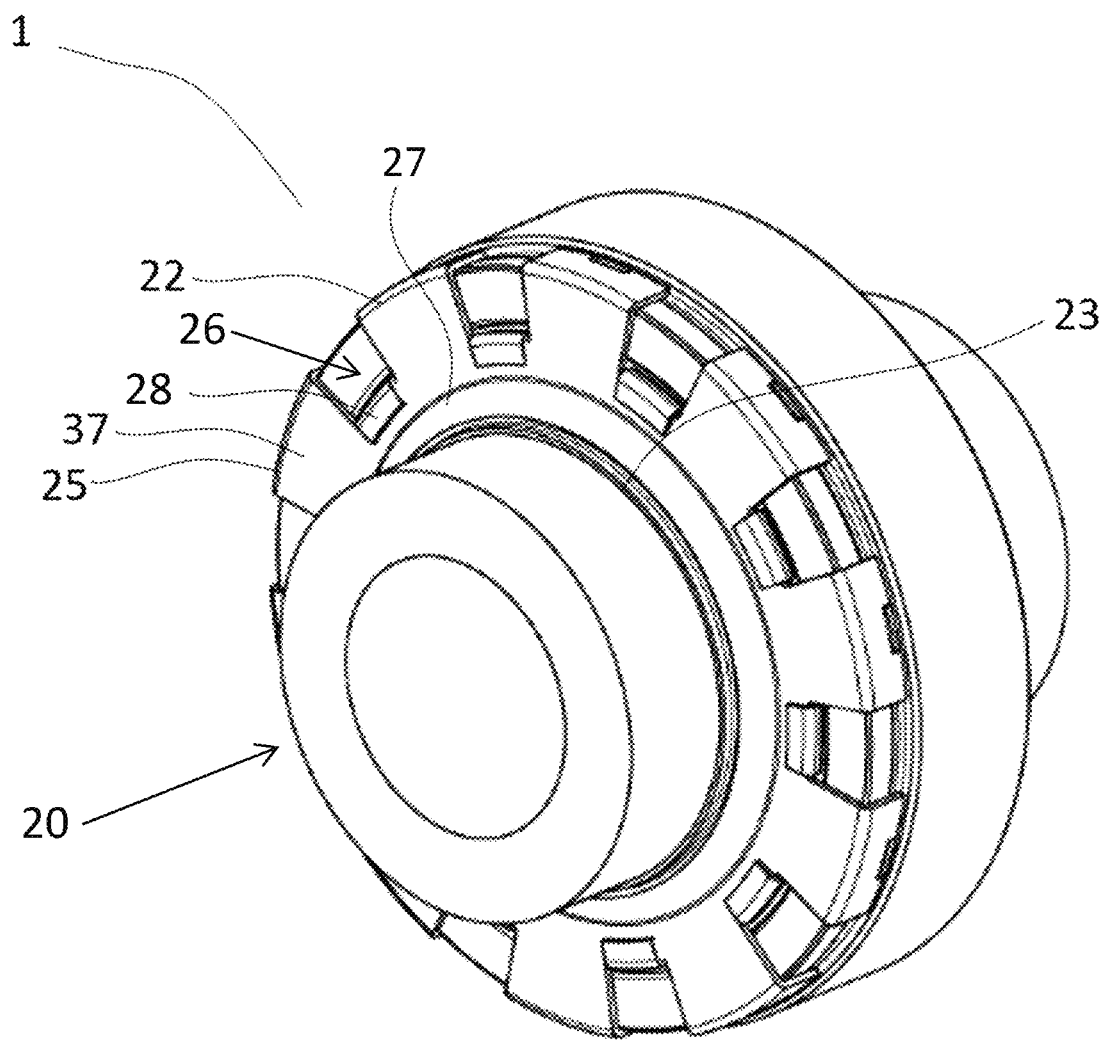
FIG. 3 shows an exemplary embodiment of the rolling bearing apparatus according to FIG. 1 without the first machine element 4.

FIG. 3—FIG. 3 shows part of the rolling bearing apparatus 2 without the first machine element 4, 30. This is substantially covered by the retaining ring 22 on one side. The retaining ring 22 is provided with cutouts 26 that pass axially through it in a continuous manner. In this case, the cutouts 26 are open radially outwards and are delimited on both sides in the circumferential direction by a lever arm 37 of a retaining element 25 and in the radial direction inwardly by the main body 27 of the retaining ring 22. Alternatively, it is also possible for the cutouts to be windows in a form that is not shown, which are also delimited radially outwardly by the material of the main body 27. The cutouts 26 can optionally have curved contours or the rectangular contours shown. The retaining clip 28 extends axially through the cutout 26 and is attached to the retaining ring 22 in a form-fitting manner.

FIGS. 1-3—An electrically conductive connection between the housing 4 and the bypass apparatus 20 is made via the outer ring 11. In this way, an electrical connection between the first machine element 30 and the second machine element 9, 31 is formed via the bypass apparatus 20. The electrical connection leads to the bypass conductor 23 via the holder 21. The bypass conductor 23 is in sliding contact with the second machine element 9, 31 and optionally with the component 13 designed as the sleeve 13, is in contact with the shaft 9, for example via a press fit. In this case, the shaft 9 or alternatively the sleeve 35 is the second machine element 31. A radial air gap of at least the size of a clearance fit can be formed between the sleeve 35 and the shaft 9. In this case, the shaft 9 can also optionally be the second machine element 31.

Figure 4:
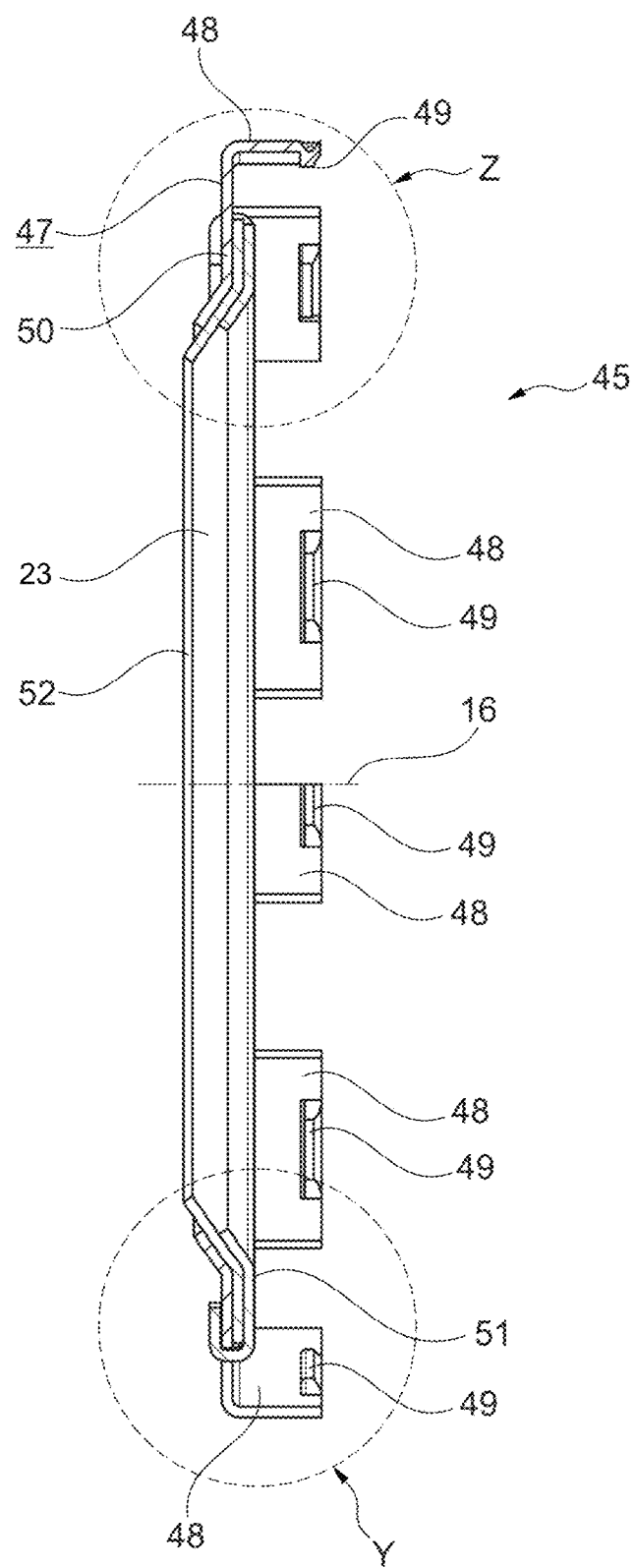
FIG. 4 shows an exemplary embodiment of a bypass apparatus 20 in longitudinal section.

FIG. 4—The bypass apparatus 45 consists of a bypass conductor 23 and a holder 47. A retaining element 50 of the holder 47 is provided with axially extending retaining elements 48. On the retaining element 48, a radial protrusion 49 for a snap-in mount is formed on a rolling bearing, not shown. The holder 47 additionally comprises a retaining disk 51. The bypass conductor 23 is an annular disk with a through-hole 52 penetrating centrally through the axis of rotation 16.

Figure 5:
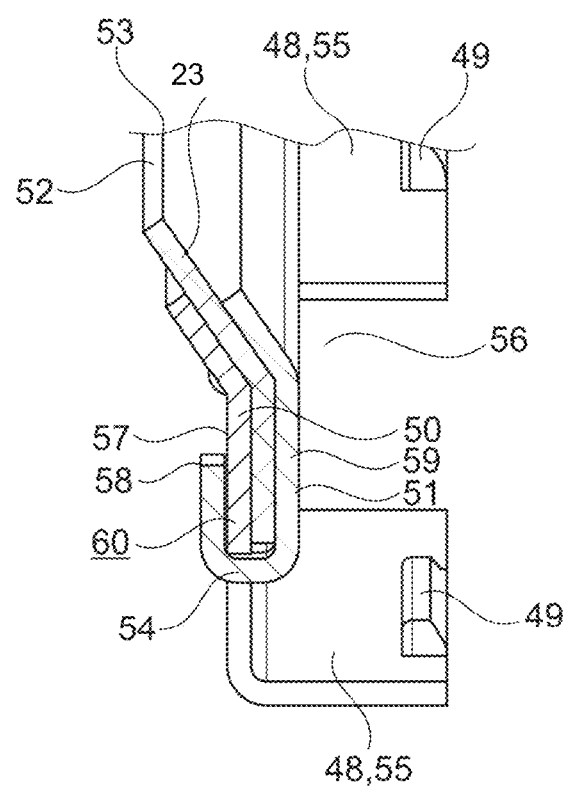
FIG. 5 shows the detail Y of the bypass apparatus shown in FIG. 4.
Figure 6:
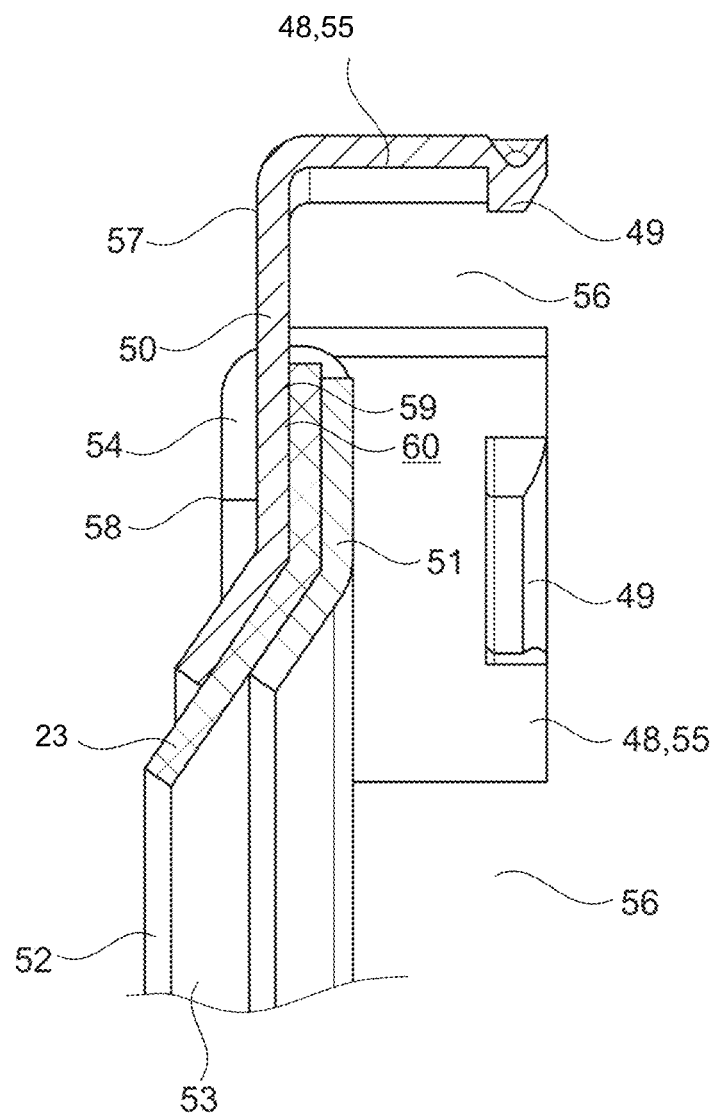
FIG. 6 shows the detail Z of the bypass apparatus shown in FIG. 4.

FIGS. 5 and 6—The detail Y from FIG. 4 is enlarged in FIG. 5 and is not shown to scale. The detail Z from FIG. 4 is enlarged in FIG. 6 and is not shown to scale. At least the edge region 53 of the annular disk at the through-hole 52 is provided for contact with a shaft (not shown), alternatively with an inner ring (not shown) or alternatively with a hollow-cylindrical component similar to the component 13 shown in FIG. 2. The bypass conductor 23 is clamped axially between the retaining disk 51 and the retaining ring 50 and consists of a mesh or fabric of electrically conductive carbon fibers. The retaining elements 48 are designed to be in one piece and of one material with the retaining ring 50 and are elastic clamps 55, with the axially directed end of which the radial protrusion 49 is designed to be in one piece and of one material. The retaining elements 48 are spaced apart from one another circumferentially by cutouts 56.

Clamping elements 54 are formed in one piece and made of one material on the retaining disk 51. The retaining disk 51 bears on the rear side against the bypass conductor 23 and axially penetrates one of the cutouts 56 with a clamping element 54. On the front side 57 of the retaining ring 50, the clamping element 54 engages behind the retaining ring 50 on the front side and bears axially with its radial end 58 against the front side 57 of the retaining ring 50. The retaining disk 51 on the rear side 59 of the retaining ring 50 and the clamping element 54 on the front side 57 of the retaining ring 50 form a form-fitting, but non-releasable, clamping connection 60 between the retaining ring 50, the bypass conductor 23 and the retaining disk 51. The retaining ring 50 and retaining disk 51 are components cut from sheet metal and cold-formed components.

FIGS. 7, 8, 9 and 10—FIGS. 7, 8, 9 and 10 show different embodiments of the bypass conductor 23 which is formed from loop-shaped stitched fibers.

Figure 7:
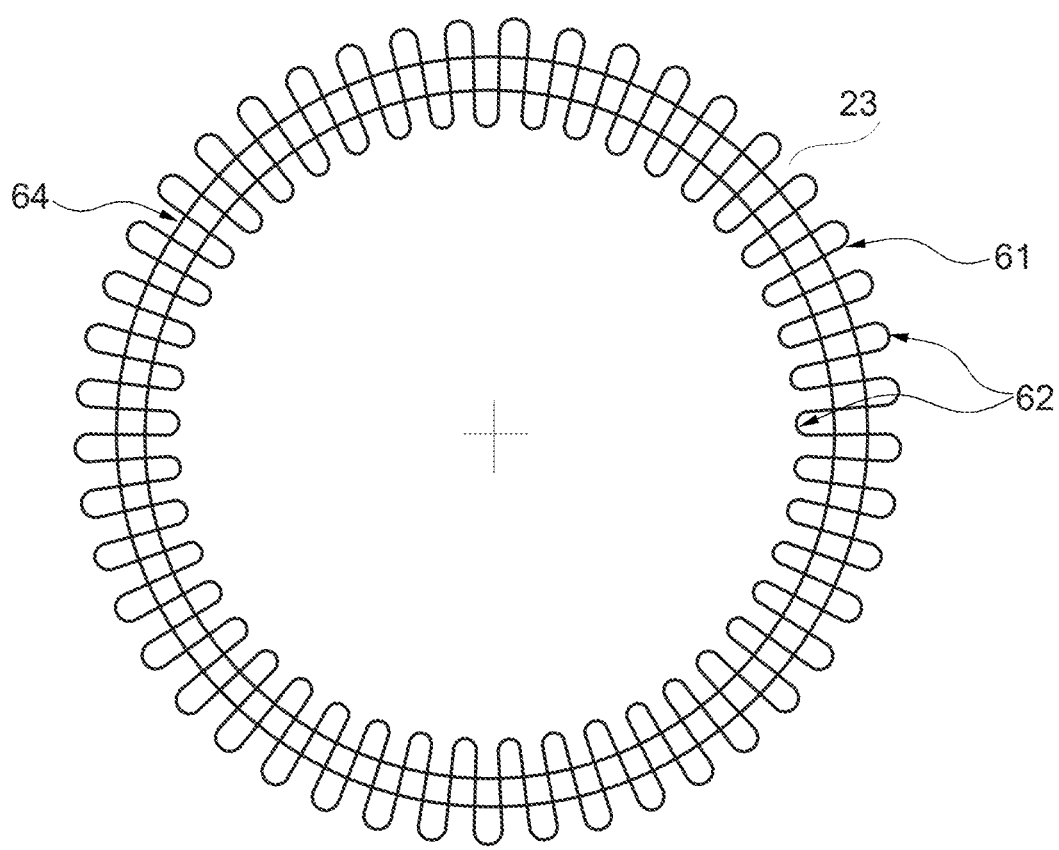
FIG. 7 shows an exemplary embodiment of the bypass conductor 23 with loop-shaped stitched fibers with meandering shape.

FIG. 7—The bypass conductor 23 is shown schematically with respect to its structure. In this case, the loop-shaped stitched fibers 61 of the bypass conductor 23 are stitched with a meandering shape. The loops 64 are formed both on the distal side and on the proximal side with respect to the center of the bypass conductor. Furthermore, the concentrically arranged, stitched fiber bundle is shown, which serves to improve fiber cohesion.

Figure 8:
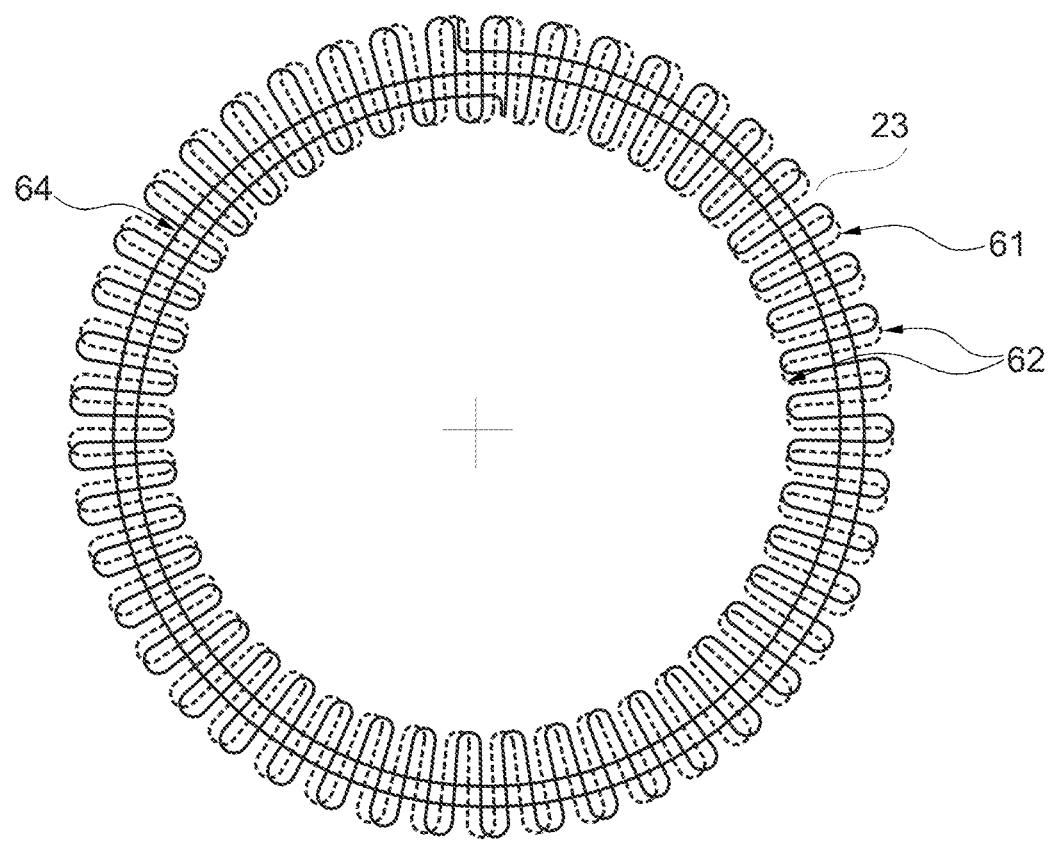
FIG. 8 shows a further exemplary embodiment of the bypass conductor 23 with loop-shaped stitched fibers in superimposed meandering shape.

FIG. 8—The bypass conductor 23 is shown schematically with respect to its structure. In this case, the loop-shaped stitched fibers, or fiber bundles 61, of the bypass conductor 23 are stitched with a double, superimposed meandering shape. This embodiment also shows the further, concentrically arranged, stitched fiber bundle.

Figure 9:
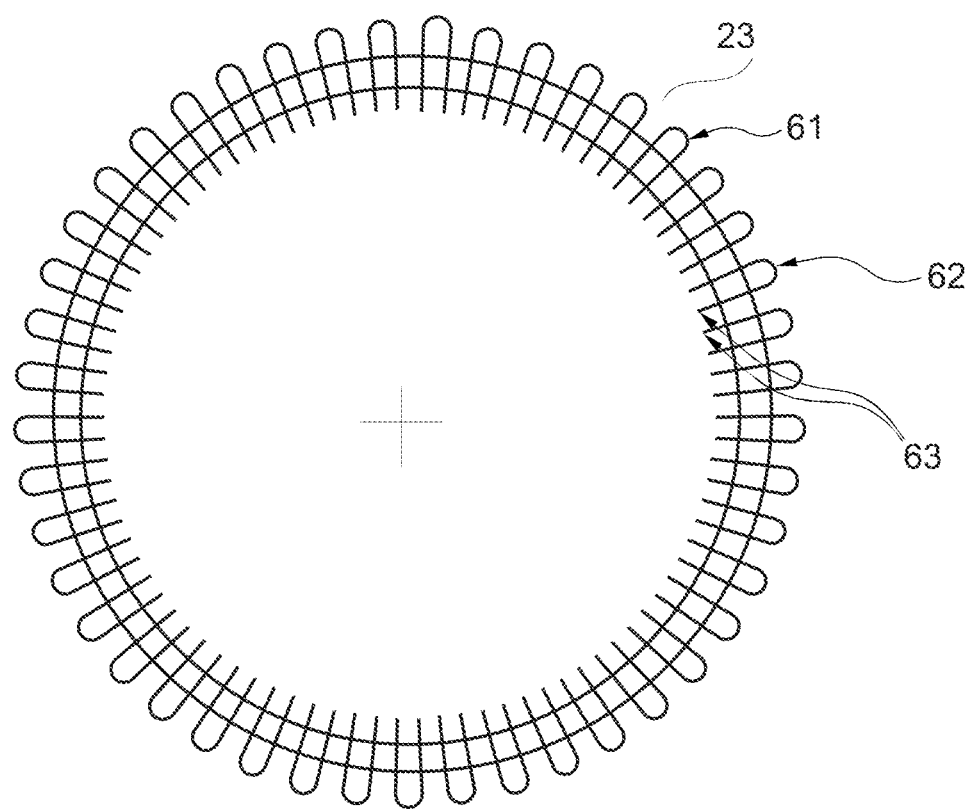
FIG. 9 shows a further exemplary embodiment of the bypass conductor 23 with fiber cross sections open proximally to the axis of rotation.

FIG. 9—The bypass conductor 23 is shown schematically with respect to its structure. The loop-shaped stitched fibers or fiber bundles 61 of the bypass conductor 23 have proximally open fiber cross sections 63 pointing to the axis of rotation.

Figure 10:
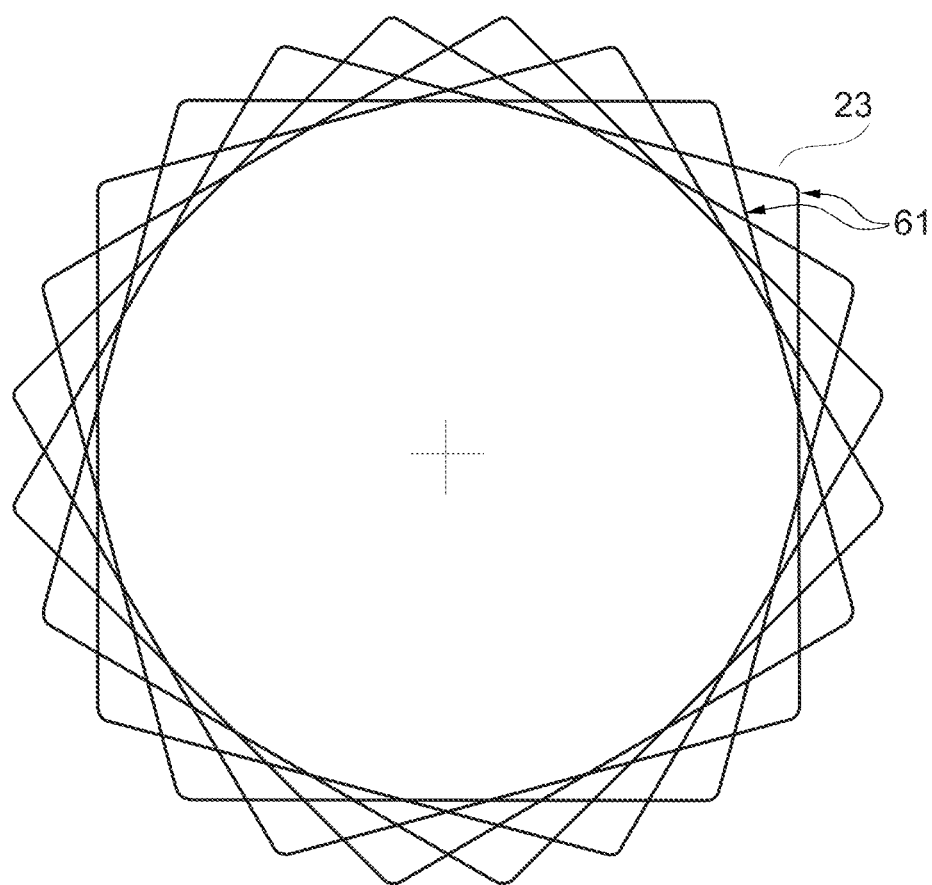
FIG. 10 shows a further exemplary embodiment of the bypass conductor 23 with loop-shaped stitched fibers with a polygon shape.

FIG. 10—In the embodiment shown here, the bypass conductor 23/46 shows loop-shaped stitched fibers or fiber bundles of the bypass conductor 23 with a polygon shape.

REFERENCE NUMERALS

1 Rolling bearing apparatus
2 Set of cylinder rollers
4 Housing
5 First bearing ring
7 Cage
8 Cylinder roller
9 Shaft
11 Outer ring
13 Hollow-cylindrical component
16 Axis of rotation of the set of cylinder rollers
20 Bypass apparatus
21 Holder of the bypass apparatus
22 Retaining ring
23 Bypass conductor
24 Retaining disk
25 Retaining element
26 Cutout
27 Main body of the holder
28 Retaining clip
29 Clamp
30 First machine element
31 Second machine element
35 Sleeve
37 Lever arm
38 Inner seat surface
39 Outer seat surface
40 Radial depression, annular groove
41 Radial protrusions
45 Bypass apparatus
46 Bypass conductor
47 Holder of the bypass apparatus
48 Retaining element
49 Radial protrusion of the retaining element
50 Retaining ring
51 Retaining disk
52 Through-hole
53 Edge region of the through-hole
54 Clamping element
55 Clamp
56 Cutout
57 Front side of the retaining ring
58 End of the clamping element 14
59 Rear side of the retaining ring
60 Clamping connection
61 Fiber bundles
62 Loop
63 Proximally open fiber cross sections
64 Concentrically arranged fiber bundles

The invention claimed is:

1. A rolling bearing apparatus, comprising:
a set of cylinder rollers,
a bearing ring,
a bypass apparatus,
a first machine element, and
a second machine element,
wherein:
the set of cylinder rollers comprises a plurality of cylinder rollers and a cage,
the bearing ring is arranged concentrically on an axially oriented axis of rotation of the rolling bearing apparatus,
the plurality of cylinder rollers are arranged radially between the bearing ring and the second machine element, and directed radially transverse to the axis of rotation,
at least one electrical connection between the first machine element and the second machine element is formed via the bypass apparatus,
the bypass apparatus has a holder and at least one electrically conductive bypass conductor, and the holder and the bypass conductor are electrically conductively connected to one another,
the holder is attached to the bearing ring radially between the bearing ring and the first machine element and holds the bypass conductor, and the bearing ring is attached to the first machine element, and
the bypass conductor is formed from loop-shaped stitched fibers.

2. The rolling bearing apparatus according to claim 1, wherein the loop-shaped stitched fibers of the bypass conductor are stitched in a meandering shape.

3. The rolling bearing apparatus according to claim 1, wherein the loop-shaped stitched fibers of the bypass conductor are stitched in a double-superimposed meandering shape.

4. The rolling bearing apparatus according to claim 1, wherein the loop-shaped stitched fibers of the bypass conductor are arranged in a polygon shape.

5. The rolling bearing apparatus according to claim 1, wherein the loop-shaped stitched fibers of the bypass conductor have fiber cross sections which are open proximally to the axis of rotation.

6. The rolling bearing apparatus according to claim 1, wherein the loop-shaped stitched fibers of the bypass conductor are stitched to a concentrically arranged fiber bundle.

7. The rolling bearing apparatus according to claim 1, wherein the loop-shaped stitched fibers of the bypass conductor comprise constituents of carbon or derivatives of carbon.

8. The rolling bearing apparatus according to claim 1, wherein the loop-shaped stitched fibers of the bypass conductor are stitched on a textile base fabric.

9. A rolling bearing apparatus, comprising:
an axis of rotation;
a first machine element;
a second machine element;
a bearing ring attached to the first machine element and arranged concentrically on the axis of rotation;
a set of cylinder rollers comprising:
a plurality of cylinder rollers guided and arranged radially between the bearing ring and the second machine element, the plurality of cylinder rollers being directed radially transverse to the axis of rotation; and
a bypass apparatus forming an electrical connection between the first machine element and the second machine element, the bypass apparatus comprising:
an electrically conductive bypass conductor formed from loop-shaped stitched fibers; and
a holder attached on the bearing ring radially between the bearing ring and the first machine element, wherein the holder is electrically conductively connected to the bypass conductor and holds the bypass conductor.

10. The rolling bearing apparatus of claim 9, wherein the loop-shaped stitched fibers are stitched in a meandering shape.

11. The rolling bearing apparatus of claim 9, wherein the loop-shaped stitched fibers are stitched in a double-superimposed meandering shape.

12. The rolling bearing apparatus of claim 9, wherein the loop-shaped stitched fibers are arranged in a polygon shape.

13. The rolling bearing apparatus of claim 9, wherein the loop-shaped stitched fibers have fiber cross sections which are open proximally to the axis of rotation.

14. The rolling bearing apparatus of claim 9, wherein the loop-shaped stitched fibers are stitched in a concentrically arranged fiber bundle.

15. The rolling bearing apparatus of claim 9, wherein the loop-shaped stitched fibers comprise constituents of carbon or derivatives of carbon.

16. The rolling bearing apparatus of claim 9, wherein the loop-shaped stitched fibers are stitched on a textile base fabric.

17. A rolling bearing apparatus, comprising:
an axis of rotation;
a first machine element;
a second machine element;
a bearing ring attached to the first machine element and arranged concentrically on the axis of rotation;
a set of cylinder rollers comprising:
a plurality of cylinder rollers arranged radially between the bearing ring and the second machine element, the plurality of cylinder rollers being directed radially transverse to the axis of rotation; and
a cage; and
a bypass apparatus forming an electrical connection between the first machine element and the second machine element, the bypass apparatus comprising:
an electrically conductive bypass conductor formed from stitched fibers, wherein each stitched fiber has a curved portion which opens in at least one of a radially inwardly direction or a radially outward direction; and
a holder attached on the bearing ring radially between the bearing ring and the first machine element, wherein the holder is electrically conductively connected to the bypass conductor and holds the bypass conductor.

18. The rolling bearing apparatus of claim 17, wherein the curved portions of the stitched fibers circumferentially alternate between being open in the radially inward direction and being open in the radially outward direction such that the stitched fibers are stitched to form a meandering shape.

19. The rolling bearing apparatus of claim 18, wherein the loop-shaped stitched fibers of the bypass conductor are stitched in a double-superimposed meandering shape.

20. The rolling bearing apparatus of claim 17, wherein
the stitched fibers are stitched in a concentrically arranged fiber bundle, or
the stitched fibers of the bypass conductor have fiber cross sections which are open proximally to the axis of rotation.

* * * * *